(12) United States Patent
Rogers

(10) Patent No.: US 11,415,474 B2
(45) Date of Patent: Aug. 16, 2022

(54) PRESSURE SENSOR AND SYSTEM FOR MEASURING PRESSURE

(71) Applicant: The Boeing Company, Chicago, IL (US)

(72) Inventor: John E. Rogers, Owens Cross Roads, AL (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 16/901,842

(22) Filed: Jun. 15, 2020

(65) Prior Publication Data

US 2021/0389200 A1 Dec. 16, 2021

(51) Int. Cl.
*G01L 9/00* (2006.01)
*G01L 9/12* (2006.01)

(52) U.S. Cl.
CPC .......... *G01L 9/0072* (2013.01); *G01L 9/0044* (2013.01)

(58) Field of Classification Search
CPC ....... G01L 9/00; G01L 9/0044; G01L 9/0072; G01L 9/12
See application file for complete search history.

(56) References Cited

U.S. PATENT DOCUMENTS

| | | | | |
|---|---|---|---|---|
| 5,024,100 A | * | 6/1991 | Weinstein | G01L 19/02 73/724 |
| 7,146,861 B1 | * | 12/2006 | Cook | A61B 5/0215 73/718 |
| 7,181,975 B1 | * | 2/2007 | Bradley | A61B 5/0215 361/283.1 |
| 11,162,972 B2 | * | 11/2021 | Abdolvand | G01P 15/097 |
| 2007/0074579 A1 | * | 4/2007 | Cook | G01L 9/0072 73/718 |

FOREIGN PATENT DOCUMENTS

CA 2381494 A1 * 2/2001 ........... G01L 9/0072

OTHER PUBLICATIONS

Collins, C. C., "Miniature passive pressure transensor for implanting in the eye," IEEE Transactions on Biomedical Engineering, vol. BME-14, No. 2, Apr. 1967, pp. 74-83.

Fonseca, M. A. et al., "Wireless micromachined ceramic pressure sensor for high-temperature applications," Journal of Microelectromechanical Systems, Nov. 2002, pp. 337-343.

(Continued)

*Primary Examiner* — Nguyen Q. Ha
(74) *Attorney, Agent, or Firm* — Sage Patent Group

(57) ABSTRACT

A pressure sensor includes an input terminal configured to receive an electrical input signal and an output terminal configured to provide an electrical output signal in response to the electrical input signal. The pressure sensor also includes an acousto-mechanical diaphragm and an electrically conductive element formed on the acousto-mechanical diaphragm. The pressure sensor further includes a distributed element filter configured to capacitively couple the input terminal to the output terminal. The distributed element filter is spaced from the electrically conductive element by an air gap. The air gap changes in response to a deflection of the acousto-mechanical diaphragm caused by a change in pressure on the acousto-mechanical diaphragm.

20 Claims, 9 Drawing Sheets

(56) References Cited

OTHER PUBLICATIONS

Fonseca, M. A., et al., "Flexible wireless passive pressure sensors for biomedical applications," Solid-State Sensors, Actuators, and Microsystems Workshop, Hilton Head Island, South Carolina, Jun. 4-8, 2006, pp. 37-42.

Hallil, H., et al., "Feasibility of wireless gas detection with an FMCW RADAR interrogation of passive RF gas sensor," IEEE Sensors 2010 Conference, Nov. 2010, pp. 759-762.

Mariotti, C., et al., "Development of low cost, wireless, inkjet printed microfluidic RF systems and devices for sensing on tunable electronics," IEEE Sensors Journal, vol. 15, No. 6, Jun. 2015, pp. 3156-3163.

Rogers, J.E., et al., "A passive wireless microelectromechanical pressure sensor for harsh environments," Journal of Microelectromechanical Systems, vol. 27, No. 1, Feb. 2018, pp. 73-85.

* cited by examiner

PRESSURE SENSOR AND SYSTEM FOR MEASURING PRESSURE

FIELD

The present disclosure relates generally to sensing pressure, and more particularly to a pressure sensor and system for measuring pressure.

BACKGROUND

Examples of pressure sensors include microphones. Existing microphones are typically capacitive-based microphones, which require internal or local electronics to minimize parasitic capacitance that contributes to error in the measurement of static pressure, dynamic pressure, or sound. A dynamic pressure sensor is more well known as a microphone. A buffer amplifier is typically placed close to the microphone to improve the signal to noise ratio (SNR). Such electronics also require wiring for signal feeding and powering of the sensor and electronics. The use of either internal or local electronics are undesirable for microphone use in application spaces such as high temperature environments where electronics are well known to degrade or fail.

SUMMARY

In accordance with an example, a pressure sensor includes an input terminal configured to receive an electrical input signal and an output terminal configured to provide an electrical output signal in response to the electrical input signal. The pressure sensor also includes an acousto-mechanical diaphragm and an electrically conductive element formed on the acousto-mechanical diaphragm. The pressure sensor additionally includes a distributed element filter configured to capacitively couple the input terminal to the output terminal. The distributed element filter is spaced from the electrically conductive element by an air gap. The air gap changes in response to a deflection of the acousto-mechanical diaphragm caused by a change in pressure on the acousto-mechanical diaphragm.

In accordance with another example, a system for measuring pressure includes a signal generator and a pressure sensor configured to sense a change in pressure and to receive an electrical input signal from the signal generator. The pressure sensor includes an acousto-mechanical diaphragm and an electrically conductive element formed on the acousto-mechanical diaphragm. The system also includes a distributed element filter spaced from the electrically conductive element by an air gap. The air gap changes in response to a deflection of the acousto-mechanical diaphragm caused by a change in pressure on the acousto-mechanical diaphragm. An amplitude of an electrical output signal from the pressure sensor changes from a nominal amplitude in response to the deflection of the acousto-mechanical diaphragm. The system also includes a pressure measurement device configured to measure at least one of a dynamic pressure or a static pressure based on a change in the amplitude of the electrical output signal from the pressure sensor.

In accordance with another example, a method of making a pressure sensor, includes forming an acousto-mechanical diaphragm and forming an electrically conductive element on the acousto-mechanical diaphragm. The method also includes forming a distributed element filter and spacing the distributed element filter from the electrically conductive element by an air gap. The air gap changes in response to a deflection of the acousto-mechanical diaphragm caused by a change in pressure on the acousto-mechanical diaphragm.

In accordance with an example and any of the preceding examples, wherein an amplitude of the electrical output signal from the pressure sensor changes from a nominal amplitude in response to the deflection of the acousto-mechanical diaphragm. At least one of a dynamic pressure or a static pressure is measured or sensed based on a change in the amplitude of the electrical output signal from the nominal amplitude, and wherein the electrical output signal is at the nominal amplitude when there is no deflection of the acousto-mechanical diaphragm.

In accordance with an example and any of the preceding examples, wherein the air gap is configured to capacitively couple the electrically conductive element to the distributed element filter, and wherein the distributed element filter has a nominal resonant frequency when there is no change to the air gap, and wherein a change in a capacitance between the electrically conductive element and the distributed element filter occurs in response to the deflection of the acousto-mechanical diaphragm and a resonant frequency of the of the distributed element filter changes from the nominal resonant frequency in response to the change in the capacitance.

In accordance with an example and any of the preceding examples, wherein an amplitude of the electrical output signal from the pressure sensor changes in response to a change in the resonant frequency of the distributed element filter caused by the change in pressure on the acousto-mechanical diaphragm, and wherein the amplitude of the electrical output signal is used to measure a dynamic pressure or a static pressure in response to the electrical input signal being received by the pressure sensor.

In accordance with an example and any of the preceding examples, wherein the input terminal is configured to electrically connect the pressure sensor to a signal generator to receive the electrical input signal, and the output terminal is configured to electrically connect the pressure sensor to a pressure measurement device configured to measure at least one of a dynamic pressure or a static pressure.

In accordance with an example and any of the preceding examples, wherein the distributed element filter includes a plurality of electrically conductive components. Each electrically conductive component includes a first elongated member and a second elongated member extending parallel to the first elongated member at a first preset spacing between the first elongated member and the second elongated member. Each electrically conductive component also includes a base member connecting one end of the first elongated member to an adjacent end of the second elongated member. The electrically conductive components are disposed parallel to one another and at a second preset spacing from one another with the base members being alternately placed on opposite sides of the distributed element filter.

In accordance with an example and any of the preceding examples, wherein the pressure sensor also includes a first die. The acousto-mechanical diaphragm is formed in the first die. The pressure sensor also includes a second die. The distributed element filter is formed on a first side of the second die, and wherein the distributed element filter faces the electrically conductive element when the first die is attached to the second die. The pressure sensor also includes a cavity defined between the acousto-mechanical diaphragm and the distributed element filter when the first die is attached to the second die. The pressure sensor additionally includes a ground plane formed on a second side of the second die opposite to the first side.

In accordance with an example and any of the preceding examples, wherein the first die, the second die, the electrically conductive element and the distributed element filter each comprise a material to allow the pressure sensor to operate at a temperature at or above about 600 degrees centigrade.

In accordance with an example and any of the preceding examples, wherein the acousto-mechanical diaphragm comprises a predetermined thickness and a preset size when formed in the first die, and the first die includes a material having a selected elastic modulus. An acoustic resonant frequency of the pressure sensor is determined based on at least one of the predetermined thickness of the acousto-mechanical diaphragm, the preset size of the acousto-mechanical diaphragm, or the selected elastic modulus of the material of the acousto-mechanical diaphragm.

In accordance with an example and any of the preceding examples, wherein the pressure sensor further includes a vent channel between the cavity and an environment outside of the pressure sensor. The vent channel provides a pressure equilibrium on each side of the acousto-mechanical diaphragm for selectively sensing or measuring dynamic pressure by the pressure sensor.

In accordance with an example and any of the preceding examples, wherein the air gap includes a selected width and wherein an amount of the dynamic pressure is measured based on an amount of deflection of the acousto-mechanical diaphragm into the air gap caused by the change in pressure on the acousto-mechanical diaphragm.

In accordance with an example and any of the preceding examples, wherein the vent channel is closed or excluded from the pressure sensor to allow deflection of the acousto-mechanical diaphragm in response to static pressure.

In accordance with an example and any of the preceding examples, wherein the pressure sensor further includes an array of pressure sensors. Each pressure sensor is configured to measure a different predetermined acoustic frequency band of acoustic pressure. Each pressure sensor includes an acousto-mechanical diaphragm and an electrically conductive element formed on the acousto-mechanical diaphragm. Each pressure sensor also includes a distributed element filter spaced from the electrically conductive element by an air gap. The acousto-mechanical diaphragm, the electrically conductive element, and the distributed element filter are configured to measure a particular predetermined acoustic frequency band of acoustic pressure.

In accordance with an example and any of the preceding examples, wherein, for each pressure sensor, the electrically conductive element is capacitively coupled to the distributed element filter, and the acousto-mechanical diaphragm is configured to allow the air gap to change in response to the change in pressure on the acousto-mechanical diaphragm. A capacitance of the distributed element filter changes in response to the change in the air gap and a resonant frequency of the distributed element filter changes in response to the change in capacitance of the distributed element filter to measure the particular predetermined acoustic frequency band of acoustic pressure.

In accordance with an example and any of the preceding examples, wherein the method of making the pressure sensor further includes forming a cavity in a first die to define the acousto-mechanical diaphragm and forming a first layer of electrically conductive material within the cavity on the acousto-mechanical diaphragm to define the electrically conductive element on the acousto-mechanical diaphragm. The method also includes forming a second layer of electrically conductive material on a first side of a second die to define the distributed element filter, wherein the distributed element filter faces the electrically conductive element when the first die is attached to the second die. The method additionally includes forming a third layer of electrically conductive material on a second side of the second die opposite to the first side to define a ground plane. The method further includes attaching the first die to the second die, wherein the cavity is defined between the acousto-mechanical diaphragm and the distributed element filter when the first die is attached to the second die.

In accordance with an example and any of the preceding examples, wherein the method further includes forming a vent channel in the first die between the cavity and an environment outside of the pressure sensor when the first die is attached to the second die, wherein the vent channel provides a pressure equilibrium on each side of the acousto-mechanical diaphragm for selectively sensing or measuring a dynamic pressure by the pressure sensor.

In accordance with an example and any of the preceding examples, wherein the method further includes forming an array of pressure sensors. Each pressure sensor is configured to measure a different predetermined acoustic frequency band of acoustic pressure. Forming each pressure sensor includes forming an acousto-mechanical diaphragm; forming an electrically conductive element formed on the acousto-mechanical diaphragm; and forming a distributed element filter spaced from the electrically conductive element by an air gap. The acousto-mechanical diaphragm, the electrically conductive element and the distributed element filter are configured to measure a particular predetermined acoustic frequency band of acoustic pressure.

The features, functions, and advantages that have been discussed can be achieved independently in various examples or may be combined in yet other examples further details of which can be seen with reference to the following description and drawings.

DETAILED DESCRIPTION

Figure 1:
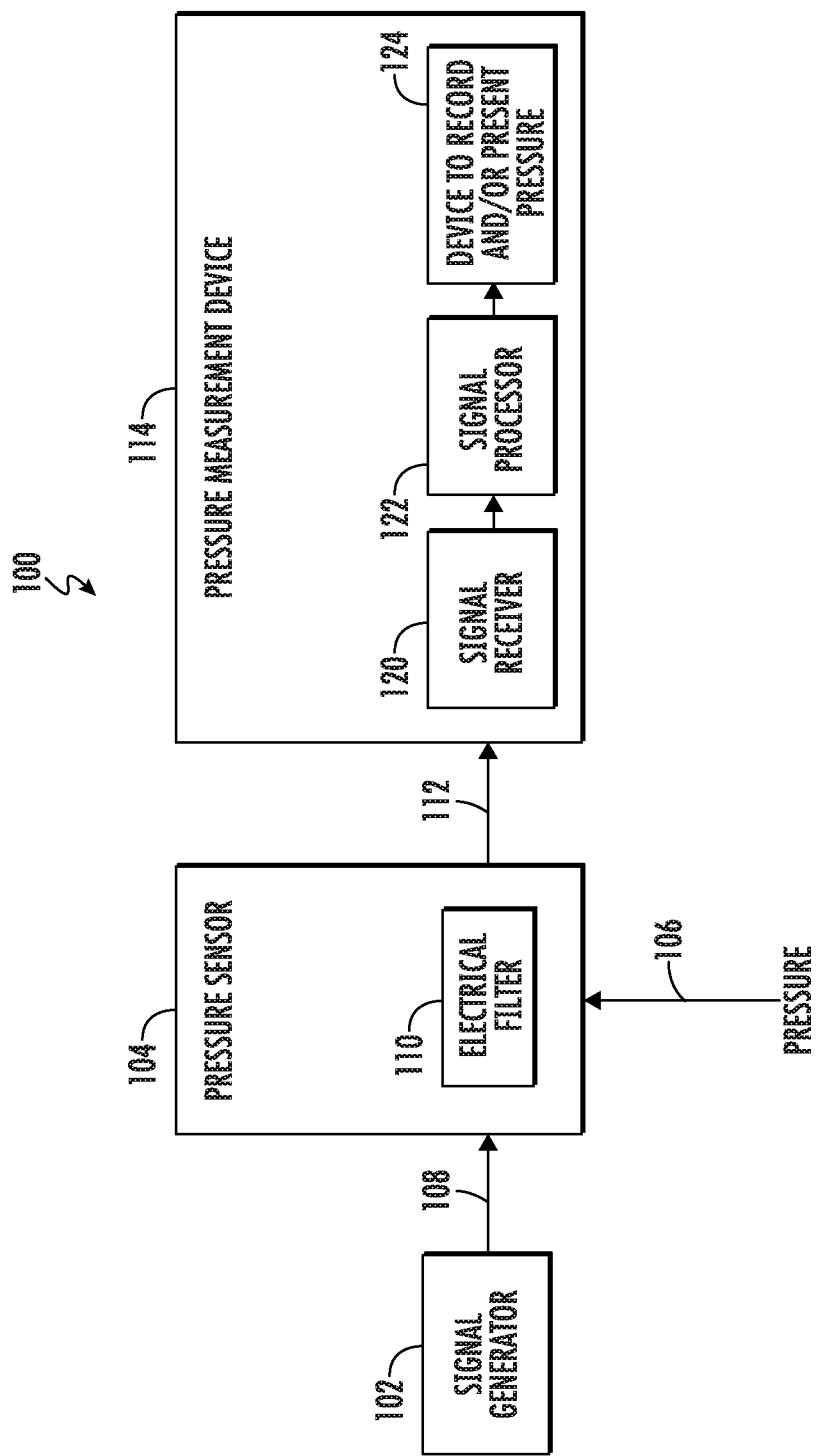
FIG. 1 is a block schematic diagram of an example of a system for measuring pressure in accordance with an example of the present disclosure.

The following detailed description of examples refers to the accompanying drawings, which illustrate specific examples of the disclosure. Other examples having different structures and operations do not depart from the scope of the present disclosure. Like reference numerals may refer to the same element or component in the different drawings.

Examples of a pressure sensor and exemplary system for sensing and measuring pressure are described herein. In some examples, the pressure sensor is a radio frequency (RF) microphone pressure sensor. The pressure sensor includes an acousto-mechanical diaphragm formed or machined into a first die. An electrically conductive element is formed or patterned on the acousto-mechanical diaphragm. A distributed element filter is formed on a first surface of a second die. A ground plane is formed on a second surface of the second die opposite the first surface. The first die and the second die are attached or bonded together to form the pressure sensor or RF microphone pressure sensor. The distributed element filter is spaced from the electrically conductive element by an air gap. The air gap changes in response to deflection of the acousto-mechanical diaphragm caused by a change in pressure on the acousto-mechanical diaphragm. The electrically conductive element is capacitively coupled to the distributed element filter. A change in capacitance between the electrically conductive element and the distributed element filter occurs in response to deflection of acousto-mechanical diaphragm. The change in capacitance causes a change in a resonant frequency of the distributed element filter and a change in an amplitude of an electrical output signal from the pressure sensor which is used to measure the pressure.

The pressure sensor or RF microphone pressure sensor is a low profile pressure sensor which is useable for measuring sound pressure levels on outer surfaces of a vehicle, e.g., wings, fuselages, etc. of an aircraft for structural health monitoring or other purposes. In some examples, the pressure sensor or RF microphone pressure sensor is made from materials capable of withstanding high temperatures, e.g., at or above 600 degrees centigrade and are configurable for monitoring conditions within a gas turbine engine or measuring pressures in other high temperature environments. The pressure sensor or RF microphone is also usable on factory floors or other environments for measuring sound pressure levels, asset tracking, assembly condition monitoring, etc.

FIG. 1 is a block schematic diagram of an example of a system 100 for measuring pressure in accordance with an example of the present disclosure. The system 100 includes a signal generator 102 and a pressure sensor 104. The pressure sensor 104 is configured to sense a pressure 106 and to receive an electrical input signal 108 from the signal generator 102. In the example in FIG. 1, the pressure sensor 104 includes an electrical filter 110 and is a microphone pressure sensor 104. A change in pressure 106 is sensed by a change in capacitance of the electrical filter 110 which alters the electrical input signal 108 and provides an electrical output signal 112 that is usable to measure the pressure 106 or change in pressure 106. In some examples, the pressure sensor 104 is a wideband radio frequency (RF) microphone pressure sensor including an array of pressure sensors 104 that are configured to sense one or more frequency bands of acoustic pressure as described in more detail herein.

The system 100 also includes a pressure measurement device 114 configured to measure the pressure 106 or change in pressure 106 using the electrical output signal 112 from the pressure sensor 104. The pressure measurement device 114 is configured to measure at least one of a dynamic pressure or a static pressure based on the configuration of the pressure sensor 104. If the pressure sensor is configured as a microphone pressure sensor, as described herein, then the electrical output signal 112 contains dynamic pressure information. If the pressure sensor is configured as a static pressure sensor, as described herein, the electrical output signal 112 contains static pressure information. In some examples, the pressure measurement device 114 includes a signal receiver 120, a signal processor 122, and a device 124 to record and/or present the measured dynamic pressure or measured static pressure. Other devices for measuring pressure are also useable for the pressure measurement device 114. The signal receiver 120 is configured to receive the electrical output signal 112 from the pressure sensor 104. Examples of the signal receiver 120 include but are not necessarily limited to a half wave rectifier, a full wave rectifier, an RF power detector, or some other analog-to-digital converter (ADC). The signal processor 122 is configured to measure at least one of the dynamic pressure or the static pressure based on the electrical output signal 112 from the pressure sensor 104. In some examples, the signal processor 122 includes a lookup table that includes a set of amplitudes of the electrical output signal 112 and corresponding dynamic pressures and/or static pressures.

Figure 2:
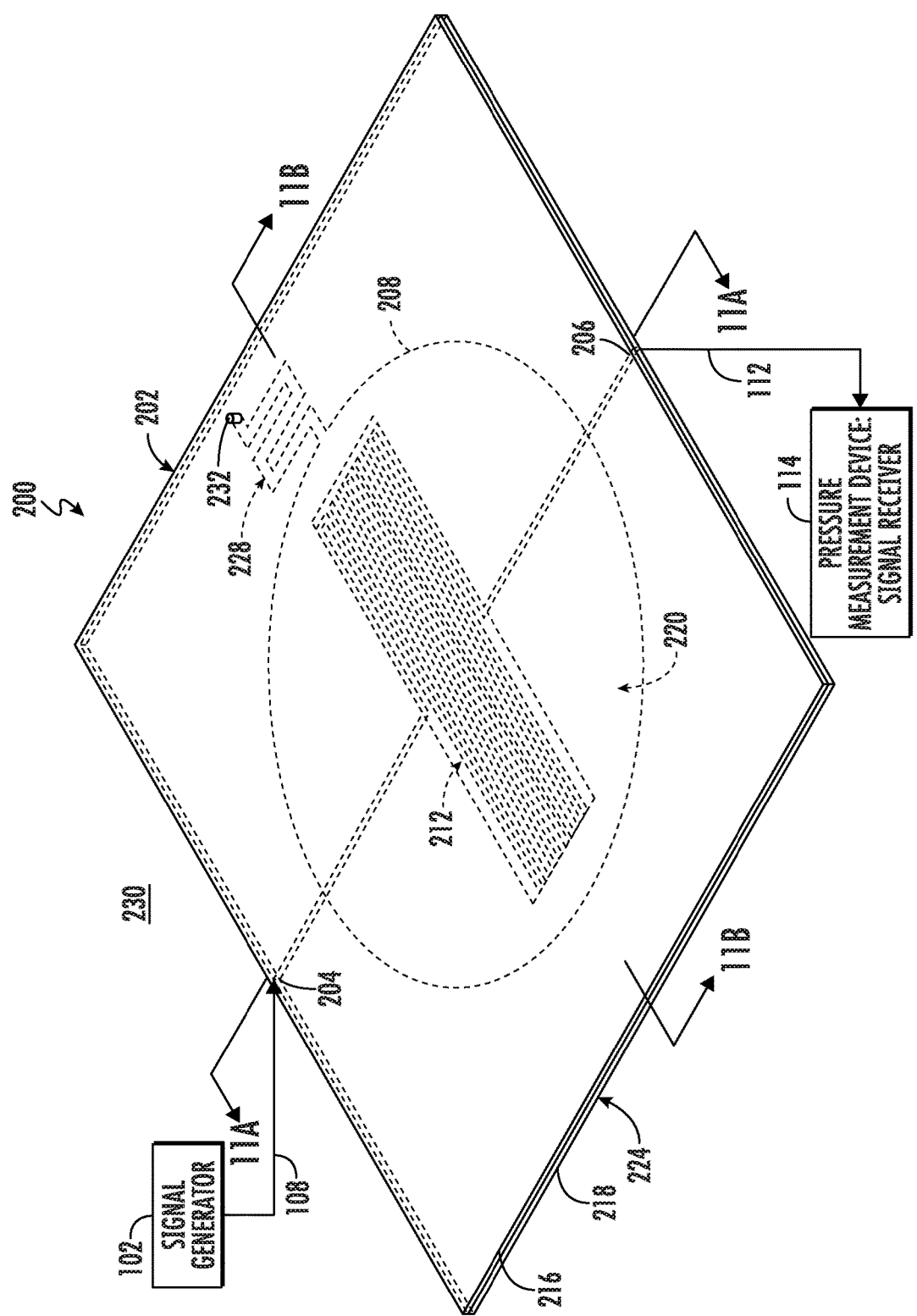
FIG. 2 is a perspective view of an example of a pressure sensor in accordance with an example of the present disclosure.
Figure 3:
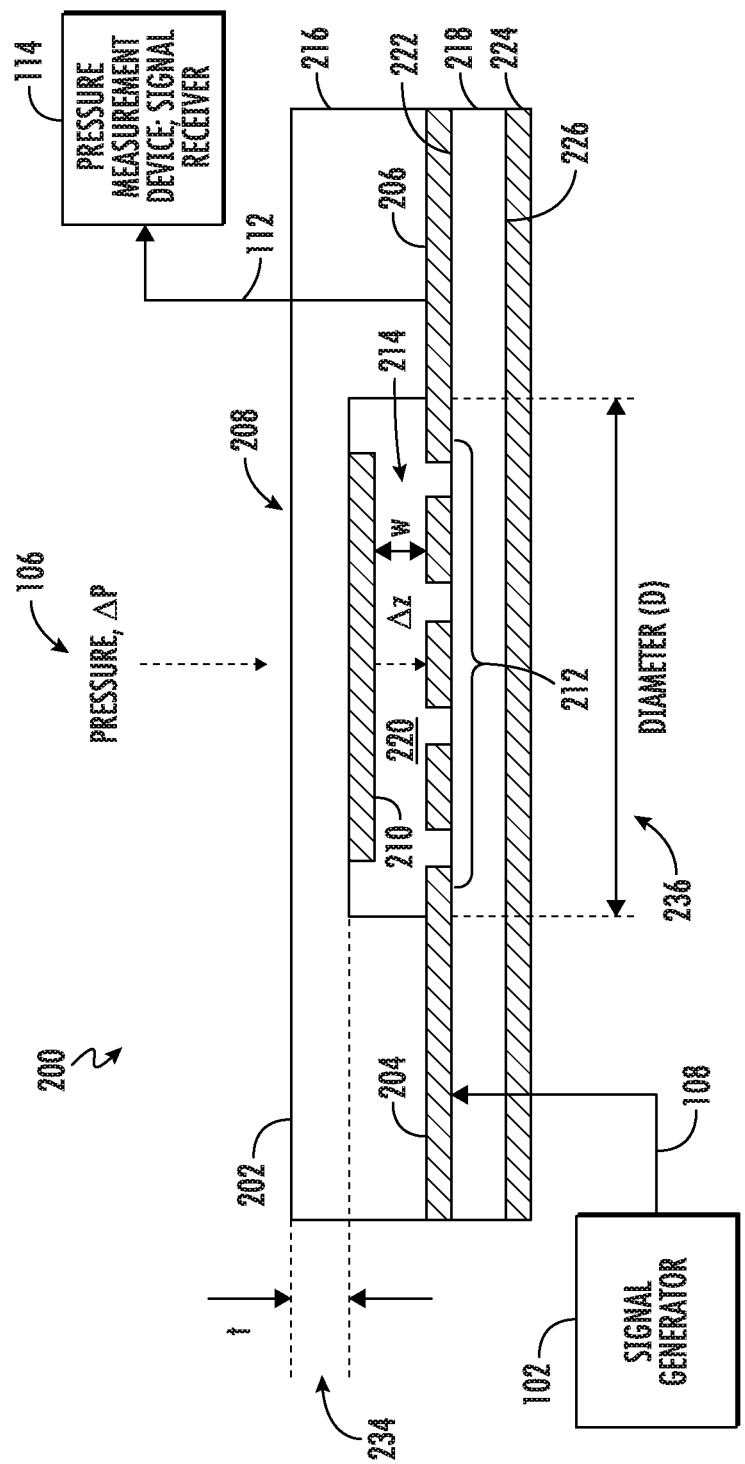
FIG. 3 is a cross-sectional view of the pressure sensor in FIG. 2 taken along lines 11A-11A in FIG. 2.

FIG. 2 is a perspective view of an example of a pressure sensor 200 in accordance with an example of the present disclosure. In some examples, the pressure sensor 200 is used for the pressure sensor 104 in the exemplary system 100 in FIG. 1. The pressure sensor 200 is an example of a radio frequency (RF) microphone 202 pressure sensor 200 which is configurable to measure dynamic pressure, e.g., time variant pressure or sound pressure levels, as described herein. As will be further described, the pressure sensor 200 is also configurable to measure static pressure, e.g., time invariant pressure or sound pressure levels. Referring also to FIG. 3, FIG. 3 is a cross-sectional view of the pressure sensor 200 or RF microphone 202 in FIG. 2 taken along lines 11A-11A. The pressure sensor 200 includes an input terminal 204 configured to receive an electrical input signal 108 from a signal generator 102. The pressure sensor 200 also includes an output terminal 206 configured to provide an electrical output signal 112 to a pressure measurement device 114 in response to the electrical input signal 108. The input terminal 204 is configured to electrically connect the pressure sensor 200 to the signal generator 102. The output terminal 206 is configured to electrically connect the pressure sensor 200 to the pressure measurement device 114. The pressure measurement device 114 is configured to measure at least one of a dynamic pressure or a static pressure based on the configuration of the pressure sensor 200 as previously described.

The pressure sensor 200 additionally includes an acousto-mechanical diaphragm 208 and an electrically conductive element 210 formed on the acousto-mechanical diaphragm 208. The pressure sensor 200 further includes a distributed element filter 212 configured to capacitively couple the input terminal 204 to the output terminal 206. The distributed element filter 212 is spaced from the electrically conductive element 210 by an air gap 214 of a selected width (W). The air gap 214 changes in response to a deflection ($\Delta z$) of the acousto-mechanical diaphragm 208 caused by a change in pressure ($\Delta P$) on the acousto-mechanical diaphragm 208. An amplitude of the electrical output signal 112 from the pressure sensor 200 changes from a nominal amplitude in response to the deflection ($\Delta z$) of the acousto-mechanical diaphragm 208. At least one of a dynamic pressure or a static pressure is measured based on a change in the amplitude of the electrical output signal 112 from the nominal amplitude. The electrical output signal 112 is at the nominal amplitude when there is no deflection of the acousto-mechanical diaphragm 208 when the electrical input signal 108 is received.

The air gap 214 is configured to capacitively couple the electrically conductive element 210 to the distributed element filter 212. The distributed element filter 212 has a nominal resonant frequency when there is no change to the air gap 214 or no deflection ($\Delta z=0$) of the acousto-mechanical diaphragm 208. A change in a capacitance between the electrically conductive element 210 and the distributed element filter 212 occurs in response to the deflection ($\Delta z$) of the acousto-mechanical diaphragm 208 and a resonant frequency of the distributed element filter 212 changes from the nominal resonant frequency in response to the change in the capacitance. The amplitude of the electrical output signal 112 from the pressure sensor 200 changes in response to a change in the resonant frequency of the distributed element filter 212 caused by the change in pressure on the acousto-mechanical diaphragm 208. The amplitude of the electrical output signal 112 is used to measure the dynamic pressure or static pressure in response to the electrical input signal 108 being received by the pressure sensor 200.

Figure 4:
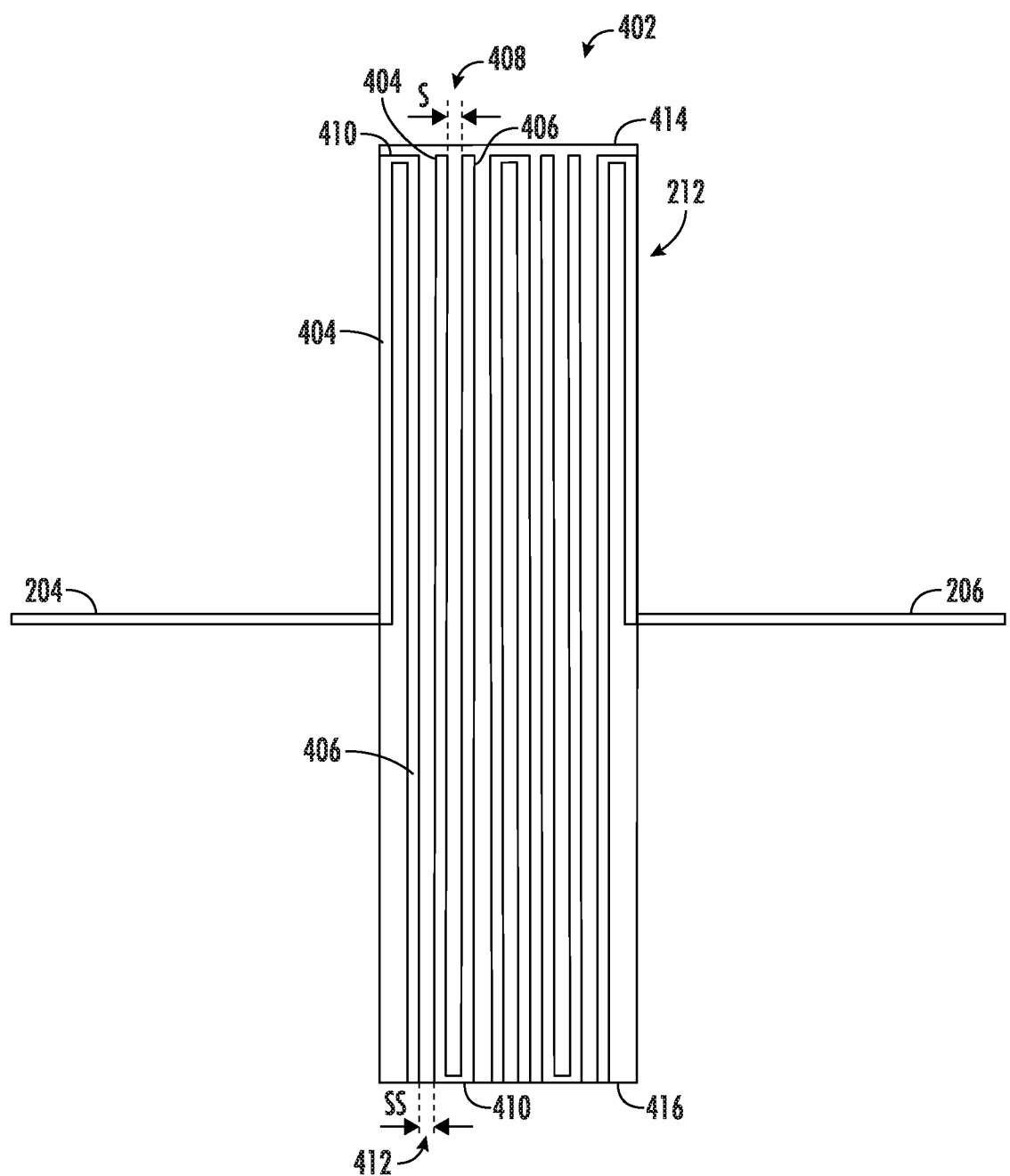
FIG. 4 is a detailed plane view of an example of a distributed element filter of the exemplary pressure sensor in FIG. 2.

Referring to FIG. 4, FIG. 4 is a detailed plane view of an example of a distributed element filter 212 of the pressure sensor 200 in FIG. 2. The distributed element filter 212 includes a plurality of electrically conductive components 402. Each electrically conductive component 402 includes a first elongated member 404 and a second elongated member 406 extending parallel to the first elongated member 404 at a first preset spacing (S) 408 between the first elongated member 404 and the second elongated member 406. Each electrically conductive component 402 also includes a base member 410 connecting one end of the first elongated member 404 to an adjacent end of the second elongated member 406. The electrically conductive components 402 are disposed parallel to one another and at a second preset spacing (SS) 412 from one another with the base members 410 being alternately placed on opposite sides 414 and 416 of the distributed element filter 212. In some examples, the first preset spacing (S) 408 and the second preset spacing (SS) 412 are equal. In other examples, the first preset spacing (S) 408 and the second preset spacing (SS) 412 are different dimensions.

Referring back to FIGS. 2 and 3, the pressure sensor 200 further includes a first die 216 and a second die 218. The acousto-mechanical diaphragm 208 is formed in the first die 216. As described in more detail with reference to FIGS. 10 and 11A-11B, a cavity 220 is formed in the first die 216 by etching, machining or other process to form the acousto-mechanical diaphragm 208. The distributed element filter 212 is formed on a first side 222 of the second die 218. The distributed element filter 212 faces the electrically conductive element 210 when the first die 216 is attached to the second die 218. A cavity 220 is defined between the acousto-mechanical diaphragm 208 and the distributed element filter 212 when the first die 216 is attached to the second die 218. The pressure sensor 200 further includes a ground plane 224 formed on a second side 226 of the second die 218 opposite to the first side 222.

The pressure sensor 200 also includes a vent channel 228 (FIG. 2) between the cavity 220 and an environment 230 outside of the pressure sensor 200 or cavity 220 of the acousto-mechanical diaphragm 208. The vent channel 228 provides a pressure equilibrium on each side of the acousto-mechanical diaphragm 208 (i.e., rejects static pressure) for sensing or measuring dynamic pressure or sound pressure levels by the pressure sensor 200. In the example illustrated in FIG. 2, the vent channel 228 has a substantially serpentine shape, e.g., a square wave shape. In other examples, the vent channel 228 may have other shapes. The purpose of the substantially serpentine shape is to increase a length of the vent channel 228, which increases the vent resistance. An increase in vent resistance decreases a cut-on frequency (or a lower acoustic frequency) of the pressure sensor 200. The cut-off frequency (or the higher acoustic frequency) of the pressure sensor 200 is determined primarily by the mechanical resonant frequency of the acousto-mechanical diaphragm 208, which is controlled by the thickness (t) 234 and size 236 or diameter (D) of the acousto-mechanical diaphragm 208 (e.g., a smaller acousto-mechanical diaphragm 208 results in a higher resonant frequency, a thicker (t) 234 acousto-mechanical diaphragm 208 also results in a higher resonant frequency). It is generally desired to minimize the cut-on frequency to as low a frequency as possible (without blocking the vent channel 228 or vent hole 232) such as to maximize the acoustic bandwidth of the pressure sensor 200. The serpentine pattern therefore helps maximize the use of available real estate on the first die 216.

As described in more detail with reference to the example in FIGS. 10 and 11A-11B, the vent channel 228 is formed in the first die 216. In the example described with reference to FIGS. 10 and 11A-11B, and as shown in the example in FIG. 2, a vent hole 232 is formed through the first die 216 to the vent channel 228. In some examples, the vent hole 232 is considered part of the vent channel 228.

As previously described, the air gap 214 includes a selected width (W) (FIG. 3). In this example, an amount of dynamic pressure is measured based on an amount of deflection ($\Delta z$) of the acousto-mechanical diaphragm 208 into the air gap 214. Alternatively, the vent channel 228 and/or vent hole 232 is closed or excluded from the pressure sensor 200 to allow deflection ($\Delta z$) of the acousto-mechanical diaphragm 208 in response to static pressure.

In some examples, the first die 216, the second die 218, the electrically conductive element 210 and the distributed element filter 212 each include a material to allow the pressure sensor 200 to operate at a temperature at or above about 600 degrees centigrade. In accordance with an example, the dies 216 and 218 are sapphire or another material that can operate at temperatures at or above 600 degrees centigrade. In some examples, the electrically conductive components of the pressure sensor 200 including the electrically conductive element 210, distributed element filter 212 and ground plane 224 are formed from platinum or another electrically conductive material that can operate at temperatures at or above 600 degrees centigrade. In an example, the pressure sensor 200 is used for structural health monitoring and/or engine condition monitoring in a gas turbine engine of an aircraft or other type vehicle. In other examples where the pressure sensor will not be operating at such high temperatures other types of materials are useable. In some examples, such as high temperature environments or other harsh environments, the signal generator 102 and pressure measurement device 114 are located at a remote location from the pressure sensor 200, e.g., outside the harsh environment.

Figure 5:
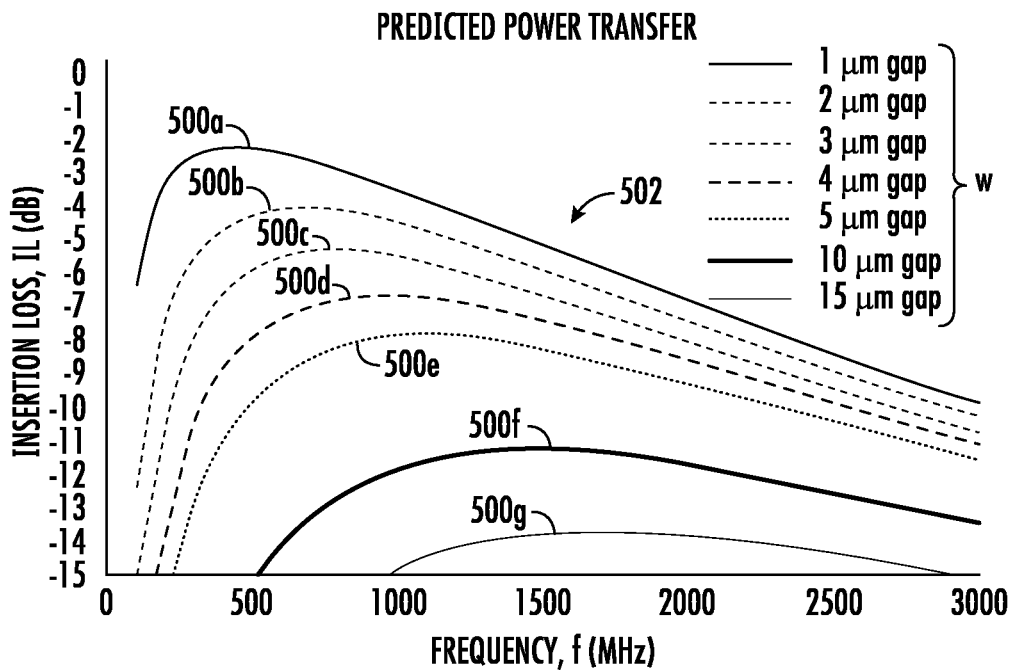
FIG. 5 illustrates predicted power transfer graphs across a frequency range for different dimensions of an air gap for the exemplary pressure sensor in FIG. 2.

The acousto-mechanical diaphragm 208 includes a predetermined thickness (t) 234 (FIG. 3) and a preset size 236 or diameter (D) when formed in the first die 216. While the shape of the acousto-mechanical diaphragm 208 in the example in FIG. 2 is shown to be substantially circular, the acousto-mechanical diaphragm 208 may also be formed in other shapes. The first die 216 includes a material having a selected elastic modulus. In some examples, the first die 216 is any rigid dielectric material that has deflection properties for sensing pressure within a desired acoustic frequency band as described herein. For example, sapphire has an elastic modulus of 435 Giga Pascal (GPa), which is 2.5 times higher than that of silicon. An acoustic resonant frequency of the pressure sensor 200 is determined based on at least one of the predetermined thickness (t) 234 of the acousto-mechanical diaphragm 208, the preset size 236 or diameter (D) of the acousto-mechanical diaphragm 208, or the selected elastic modulus of the material of the acousto-mechanical diaphragm 208. As previously described, the pressure (dynamic pressure or static pressure) causes the acousto-mechanical diaphragm 208 to deflect ($\Delta z$) and change the width (W) of the air gap 214. The change in the air gap 214 results in a change in capacitance of the distributed element filter 212. The distributed element filter 212 under a nominal (no change in air gap 214) capacitance has a nominal resonant frequency. The change in capacitance due to the deflected acousto-mechanical diaphragm 208 changes the resonant frequency of the distributed element filter 212. The amplitude of the electrical output signal 112 is at the nominal resonant frequency when there is no deflection of the acousto-mechanical diaphragm 208 and no change in the air gap 214. The amplitude of the electrical output signal 112 will change as the resonant frequency of the distributed element filter 212 changes in response to a change in the pressure, either dynamic pressure or static pressure. Referring also to FIG. 5, FIG. 5 illustrates predicted power transfer graphs 500a-500g across a range of frequencies for different widths (W) of an air gap 214 for the exemplary pressure sensor 200 in FIG. 2. Each predicted power transfer graph 500a-500g defines a power transfer function (electrical output power over electrical input power) across the range of frequencies for the exemplary pressure sensor 200 including distributed element filter 212 with a cavity 220 and electrically conductive element 210. As illustrated in the example in FIG. 5, there is a linear region 502 for each air gap width (W) where the output voltage is substantially linearly proportional to air gap width (W) over a range of frequencies.

Figure 6:
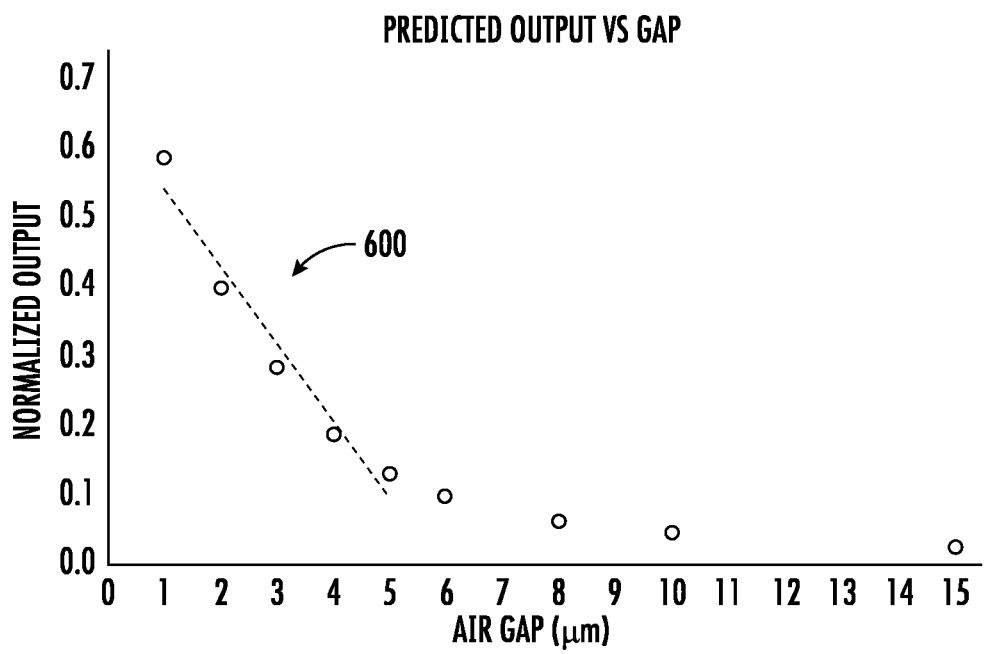
FIG. 6 is a graph of predicted normalized output versus the dimension of the air gap between the electrically conductive element and the distributed element filter of the exemplary pressure sensor in FIG. 2.

Referring also to FIG. 6, FIG. 6 is a graph 600 of predicted normalized output versus the width (W) of the air gap 214 between the electrically conductive element 210 and the distributed element filter 212 of the exemplary pressure sensor 200 in FIG. 2. The predicted normalized output versus width (W) of the air gap 214 graph 600 illustrates a change in amplitude of the electrical output signal 112 as a function of change of the air gap 214 at a particular frequency. In the example in FIG. 6, the frequency is 1500 Megahertz (MHz). An exemplary pressure sensor 200 having the exemplary power transfer characteristics illustrated in FIG. 6 is linear in a range of air gaps 214 between about 1 micrometer and about 5 micrometers, e.g., the pressure sensor 200 has high sensitivity (output over input) within a range of pressures that result in this range of changes of the air gap 214. The pressure sensor 200 can be designed to operate for any desired pressure range, e.g., 1 pascal (Pa) to 100 Pa, 10 kPa to 1 MPa, etc., by adjusting the thickness and diameter of the acousto-mechanical diaphragm 208.

The acoustic resonant frequency of a pressure sensor 200, e.g., RF microphone pressure sensor, is determined based on parameters including at least the thickness (t) 234 (FIG. 3) of the acousto-mechanical diaphragm 208, preset size 236 or diameter (D) of the acousto-mechanical diaphragm 208, and an elastic modulus of the material of the acousto-mechanical diaphragm of first die 216 from which the acousto-mechanical diaphragm 208 is formed. The thinner the thickness (t) 234, the lower the acoustic resonant frequency of the acousto-mechanical diaphragm 208 will be. The larger the size 236 or diameter (D), the lower the acoustic resonant frequency of the acousto-mechanical diaphragm 208 will be, and the lower the elastic modulus, the lower the resonant frequency of the acousto-mechanical diaphragm 208 will be.

Figure 7:
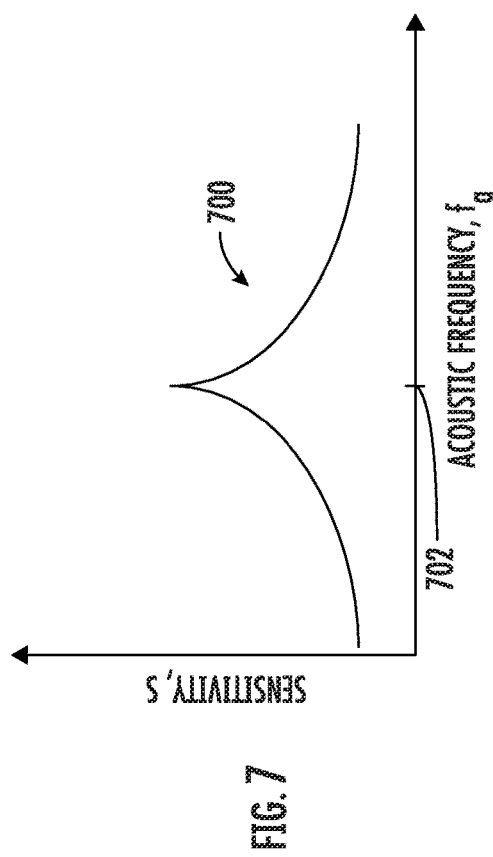
FIG. 7 is a graph of acousto-mechanical sensitivity versus acoustic frequency of the exemplary pressure sensor in FIG. 2.

FIG. 7 is a graph 700 of acousto-mechanical sensitivity (S) versus acoustic frequency (fa) of the exemplary pressure sensor 200 in FIG. 2. The acousto-mechanical sensitivity (S) of a pressure sensor or RF microphone pressure sensor is defined by the equation, $S=\Delta z/\Delta P$. The sensitivity (S) determines how good the pressure sensor 200 responds to pressure, e.g., the higher the sensitivity, the higher the output response. The pressure sensor 200 is designed to have a high sensitivity in the desired acoustic frequency range of interest with the acoustic resonant frequency 702 being within the desired frequency band as illustrated in the example of FIG. 7.

Figure 8:
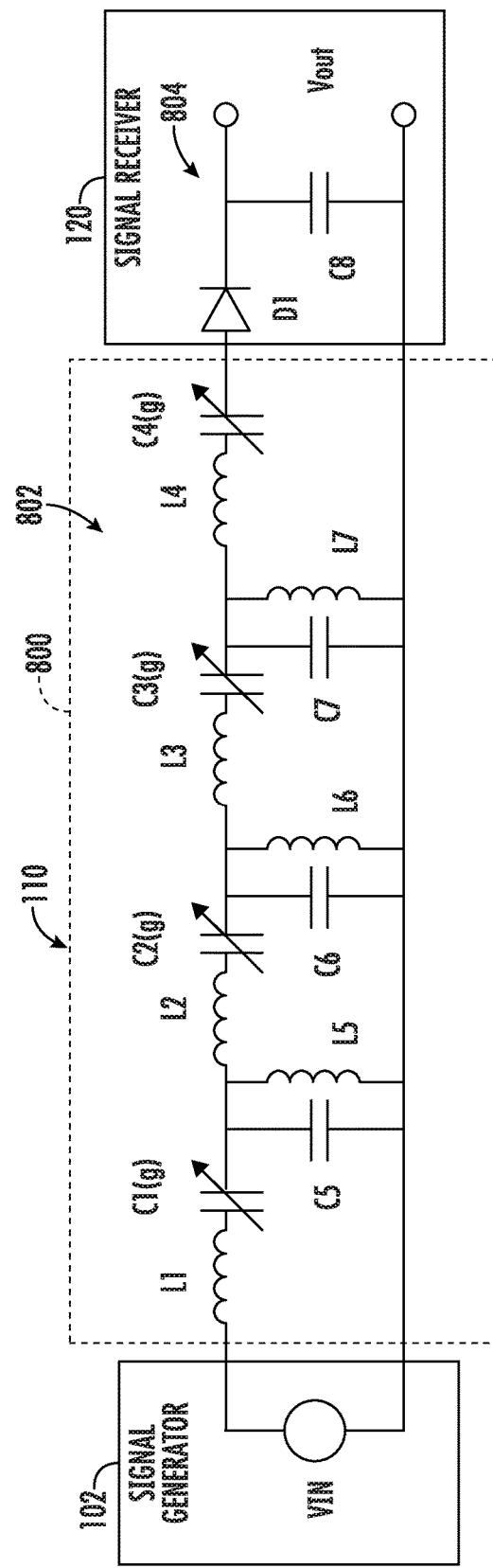
FIG. 8 is a schematic diagram corresponding to the exemplary pressure sensor in FIG. 2.

FIG. 8 is a schematic diagram of a pressure sensor 800 corresponding to the pressure sensor 200 in FIG. 2. The pressure sensor 800 includes an electrical filter 110 modeled as a lumped element model (LEM) of an inductor and capacitor (LC) circuit 802 connected between the signal generator 102 and the signal receiver 120 of the pressure measurement device 114. The LC circuit 802 includes a plurality of series connected LC pairs that each include a first inductor (L1, L2, L3, L4) connected in series with an associated variable capacitor (C1(g), C2(g), C3(g), C4(g)). A fixed capacitor (C5, C6, C7) is connected in parallel with an associated second inductor (L5, L6, L7) to ground potential between each series connected LC pair of the first inductor (L1, L2, L3, L4) connected in series with the associated variable capacitor (C1(g), C2(g), C3(g), C4(g)). The first inductor (L1, L2, L3, L4) is associated with the inductance of each electrically conductive component 402 in FIG. 4. The variable capacitor (C1(g), C2(g), C3(g), C4(g)) is associated with the capacitance between each set of electrically conductive components 402 in FIG. 4. The fixed capacitor (C5, C6, C7) is associated with the shunt capacitance to ground of each electrically conductive component 402 in FIG. 4. The second inductor (L5, L6, L7) is associated with the shunt inductance to ground of each electrically conductive component 402 in FIG. 4. In accordance with an example, the signal receiver 120 is a simple envelope detector or RF power detector 804.

Figure 9:
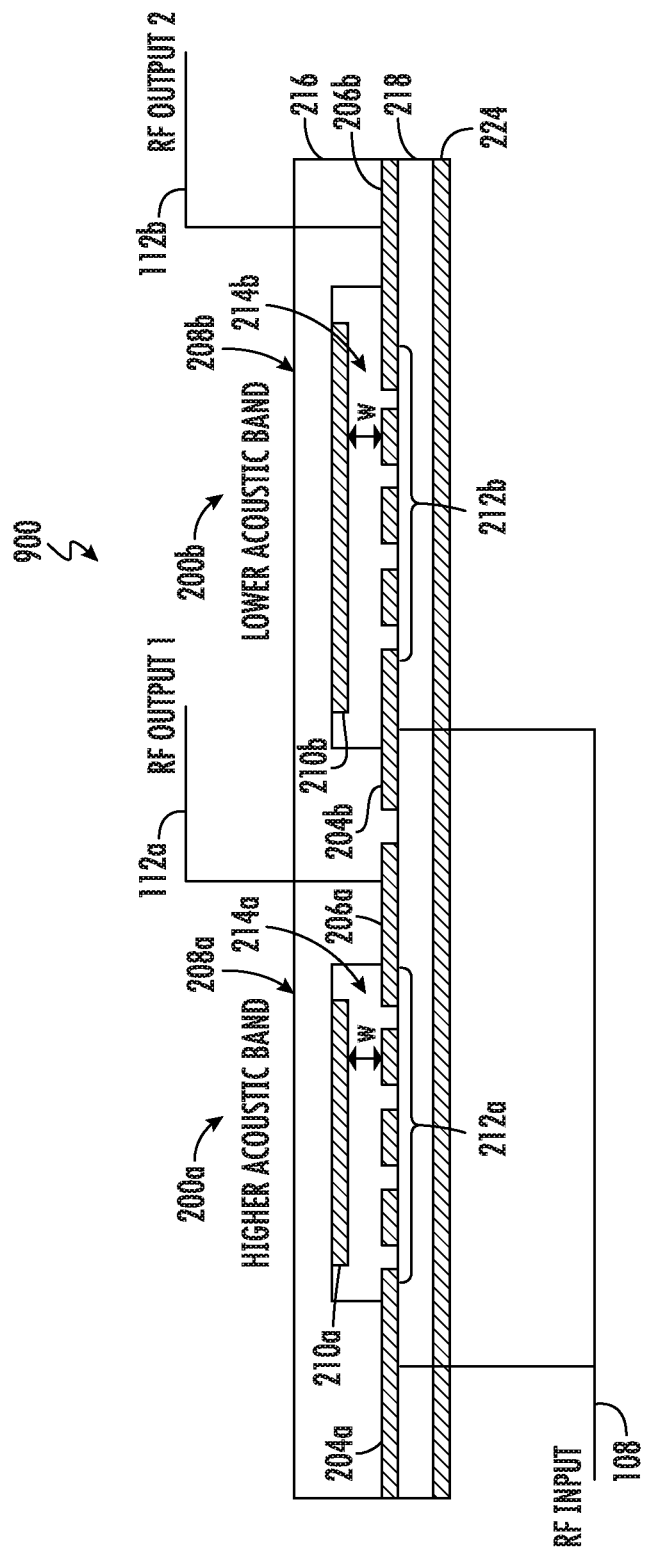
FIG. 9 is a cross-sectional view of an array of pressure sensors each configured to measure a predetermined acoustic frequency band of acoustic pressure in accordance with an example of the present disclosure.

FIG. 9 is a cross-sectional view of an array 900 of pressure sensors 200a-200b each configured to measure a predetermined acoustic frequency band of acoustic pressure in accordance with an example of the present disclosure. In some examples, the array 900 of pressure sensors 200a-200b is used for the pressure sensor 104 in FIG. 1 or the pressure sensor 200 in FIGS. 2 and 3. In some examples, each pressure sensor 200a-200b is the same or similar to the pressure sensor 200 described with reference to FIGS. 2 and 3 with each pressure sensor 200a and 200b being configured to measure a different predetermined acoustic frequency band of acoustic pressure over a larger range of acoustic pressures. Each pressure sensor 200a-200b includes an acousto-mechanical diaphragm 208a-208b and an electrically conductive element 210a-210b formed on the associated acousto-mechanical diaphragm 208a-208b. Each pressure sensor 200a-200b also includes a distributed element filter 212a-212b spaced from the associated electrically conductive element 210a-210b by an air gap 214a-214b. The acousto-mechanical diaphragm 208a-208b, the electrically conductive element 210a-210b, and the distributed element filter 212a-212b of each pressure sensor 200a-220b are configured to measure a particular predetermined acoustic frequency band of acoustic pressure. As previously described with respect to FIGS. 2 and 7, an acoustic resonant frequency of a pressure sensor 200, e.g., RF microphone pressure sensor, is determined based on parameters including a thickness (t) 234 (FIG. 3) of the acousto-mechanical diaphragm 208, a size 236 or diameter (D) of the acousto-mechanical diaphragm 208, and an elastic modulus of the material of the acousto-mechanical diaphragm 208. Accordingly, each pressure sensor 200a-200b is configured to have a sensitivity (S) in the desired acoustic frequency band based on these parameters.

For each pressure sensor 200a-200b, the electrically conductive element 210a-210b is capacitively coupled to the associated distributed element filter 212a-212b. The acousto-mechanical diaphragm 208a-208b of each pressure sensor 200a-200b is configured to allow the associated air gap 214a-214b to change in response to the change in pressure on the associated acousto-mechanical diaphragm 208a-208b. A capacitance of the distributed element filter 212a-212b changes in response to the change in the air gap 214a-214b and a resonant frequency of the distributed element filter 212a-212b changes in response to the change in capacitance of the associated distributed element filter 212a-212b. An amplitude of the electrical output signal 112a-112b from the particular pressure sensor 200a-200b changes in response to a change in the resonant frequency of the associated distributed element filter 212a-212b caused by the change in pressure on the associated acousto-mechanical diaphragm 208a-208b. The amplitude of the electrical output signal 112a-112b is used to measure a dynamic pressure or a static pressure for the particular acoustic frequency band of acoustic pressure that the particular pressure sensor 200a or 200b is configured to measure or sense. The pressure measurement device 114 measures the dynamic pressure or static pressure based on the amplitude of the electrical output signals 112a and 112b in response to the electrical input signal 108 being received by the pressure sensors 200a and 200b. While the exemplary pressure sensor array 900 in FIG. 9 includes only two pressure sensors 200a and 200b, other examples may include any number of pressure sensors.

Figure 10:
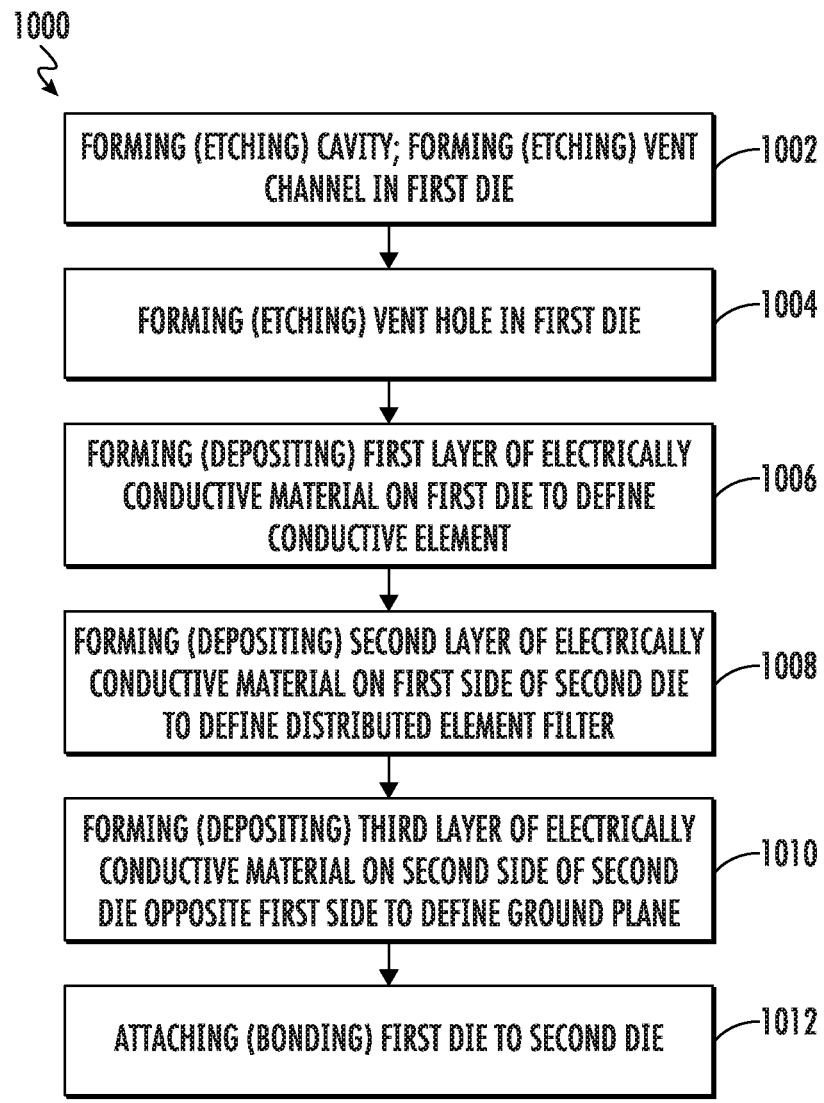
FIG. 10 is a flow chart of an example of a method for making the exemplary radio frequency microphone in FIG. 2.

FIG. 10 is a flow chart of an example of a method 1000 for making the exemplary pressure sensor 200 in FIG. 2. As previously discussed, the pressure sensor 200 is an example of an RF microphone pressure sensor. Referring also to FIGS. 11A and 11B, FIG. 11A is an illustration of a sequence of the method steps in FIG. 10 for making the exemplary pressure sensor 200 from a perspective of the cross-sectional view along lines 11A-11A in FIG. 2. FIG. 11B is an illustration of a sequence of the method steps in FIG. 10 for making the exemplary pressure sensor 200 from a perspective of the cross-sectional view along lines 11B-11B in FIG. 2.

The method 1000 of making a pressure sensor includes forming an acousto-mechanical diaphragm 208 and forming an electrically conductive element 210 on the acousto-mechanical diaphragm 208. The method 1000 also includes forming a distributed element filter 212. The method 1000, further includes spacing the distributed element filter 212 from the electrically conductive element 210 by an air gap 214. The air gap 214 changes in response to a deflection of the acousto-mechanical diaphragm 208 caused by a change in pressure 106 on the acousto-mechanical diaphragm 208.

Figure 11A:
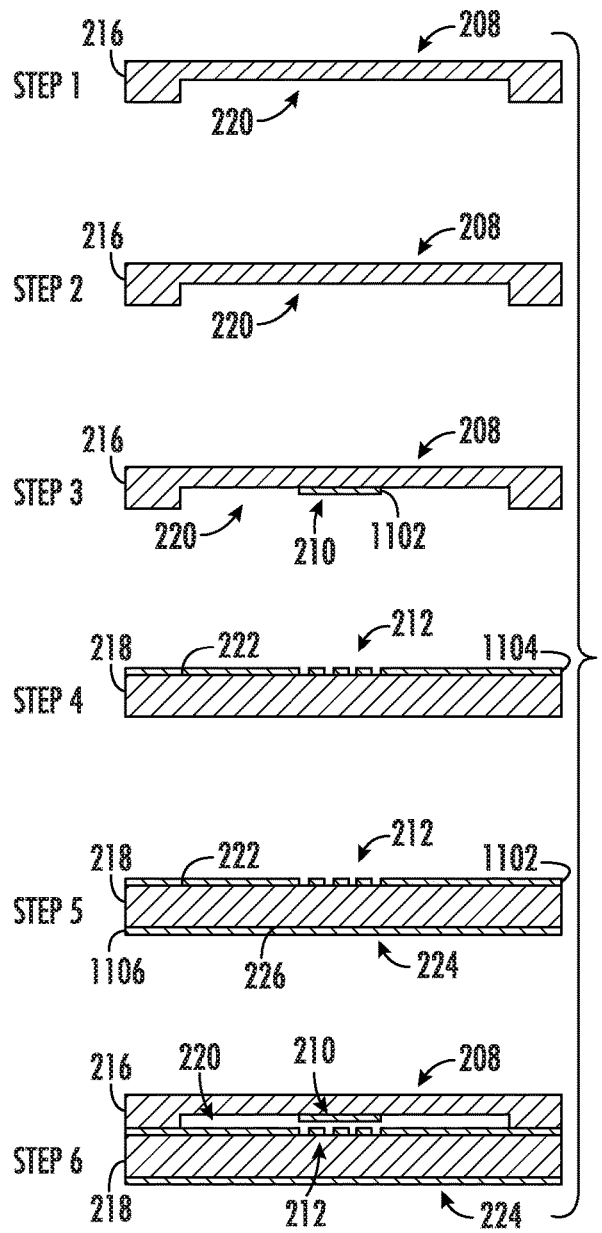
FIG. 11A is an illustration of a sequence of the method steps in FIG. 10 for making the exemplary pressure sensor from a perspective of the cross-sectional view along lines 11A-11A in FIG. 2.
Figure 11B:
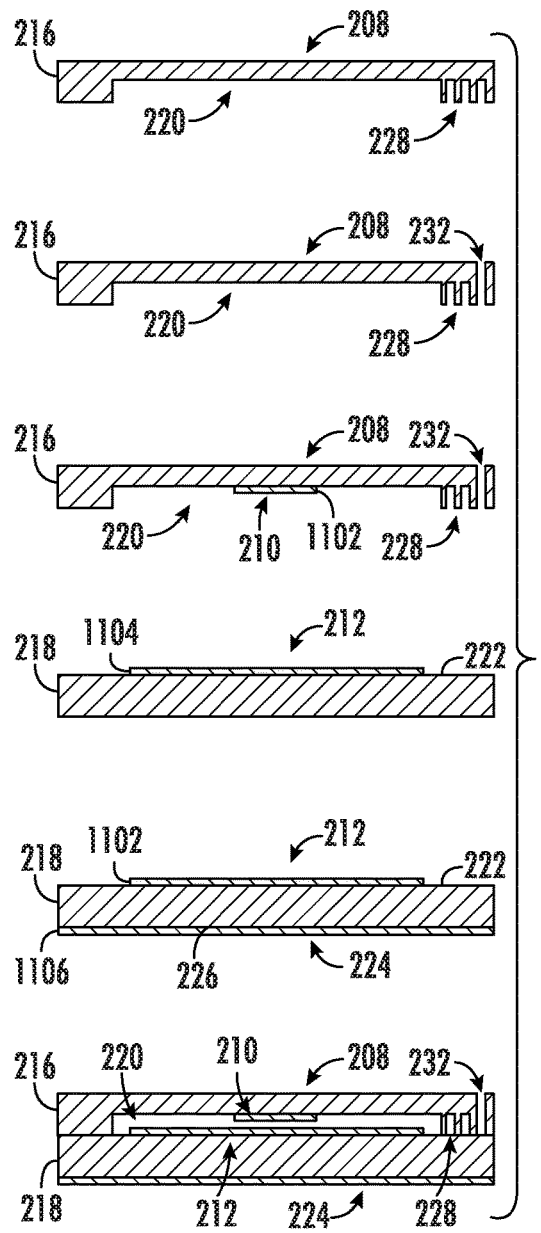
FIG. 11B is an illustration of a sequence of the method steps in FIG. 10 for making the exemplary pressure sensor from a perspective of the cross-sectional view along lines 11B-11B in FIG. 2.

In block 1002, the method 1000 includes forming a cavity 220 in a first die 216 to define the acousto-mechanical diaphragm 208 as illustrated in step 1 of FIGS. 11A and 11B. In accordance with some examples, block 1002 and step 1 also include forming a vent channel 228 in the first die 216 between the cavity 220 and an environment 230 (FIG. 2) outside of the pressure sensor 200 when the first die 216 is attached to a second die 218. In some examples, forming the cavity 220 and vent channel 228 include etching, machining or any other process capable of selectively removing the material from the first die 216. As previously described, the vent channel 228 provides a pressure equilibrium on each side of the acousto-mechanical diaphragm 208 (i.e., rejects static pressure) for sensing or measuring dynamic pressure by the pressure sensor 200.

In block 1004, the method 1000 includes forming a vent hole 232 in the first die 216 as illustrated by step 2 in FIG. 11B. The vent hole 232 opens the vent channel 228 to the outside environment 230 and provides communication between the cavity 220 and the environment 230 outside of the cavity 220 when the first die 216 and the second die 218 are attached together. In some examples, the vent hole 232 is considered part of the vent channel 228.

In block 1006, the method 1000 includes forming a first layer 1102 of electrically conductive material within the cavity 220 on the acousto-mechanical diaphragm 208 to define the electrically conductive element 210 on the acousto-mechanical diaphragm 208 as illustrated by step 3 in FIGS. 11A and 11B.

In block 1008, the method 1000 includes forming a second layer 1104 of electrically conductive material on a first side 222 of a second die 218 to define the distributed element filter 212 as illustrated in step 4 of FIGS. 11A and 11B. The distributed element filter 212 faces the electrically conductive element 210 when the first die 216 is attached to the second die 218 as illustrated in step 6 of FIGS. 11A and 11B. In some examples, the first die 216 and the second die 218 are any dielectric material. For operation in high temperature environments, e.g., at or above about 600 degrees centigrade, the first die 216 and the second die 218 are sapphire or another dielectric material capable of withstanding such temperatures.

In block 1010, the method 1000 includes forming a third layer 1106 of electrically conductive material on a second side 226 of the second die 218 opposite to the first side 222 to define a ground plane 224 as illustrated by step 5 in FIGS. 11A and 11B. In some examples, the first layer 1102 of electrically conductive material, the second layer 1104 of electrically conductive material, and the third layer 1106 of electrically conductive material are any type of electrically conductive material. For operations in high temperature environments, e.g., at or above about 600 degrees centigrade, the layers 1102-1106 of electrically conductive material are platinum or another electrically conductive material capable of withstanding such temperatures.

In block 1012, the method 1000 includes attaching the first die 216 to the second die 218 as illustrated in step 6 of FIGS. 11A and 11B. The cavity 220 is defined between the acousto-mechanical diaphragm 208 and the distributed element filter 212 when the first die 216 is attached to the second die 218.

In some examples, the method 1000 of forming the pressure sensor includes forming an array of pressure sensors, e.g., array 900 of pressure sensors 200a and 200b illustrated in FIG. 9. In some examples, each of pressure sensors 200a and 200b of the array 900 are made in the same way as that described with respect to the method 1000 in FIG. 10 and illustrated in FIGS. 11A and 11B. Each pressure sensor 200a-220b is configured to measure a different predetermined acoustic frequency band of acoustic pressure. Forming each pressure sensor 200a and 200b includes forming an acousto-mechanical diaphragm 208a and 208b and forming an electrically conductive element 210a and 210b formed on the acousto-mechanical diaphragm 208a and 208b. Forming each pressure sensor 200a and 200b also includes forming a distributed element filter 212a and 212b spaced from the electrically conductive element 210a and 210b by an air gap 214a and 214b. The acousto-mechanical diaphragm 208a/208b, the electrically conductive element 210a/210b and the distributed element filter 212a/212b are configured to measure or sense a particular predetermined acoustic frequency band of acoustic pressure as previously described.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A pressure sensor, comprising:
   an input terminal configured to receive an electrical input signal;
   an output terminal configured to provide an electrical output signal in response to the electrical input signal;
   an acousto-mechanical diaphragm;
   an electrically conductive element formed on the acousto-mechanical diaphragm;
   a distributed element filter configured to capacitively couple the input terminal to the output terminal, wherein the distributed element filter is spaced from the electrically conductive element by an air gap, and wherein the air gap changes in response to a deflection of the acousto-mechanical diaphragm caused by a change in pressure on the acousto-mechanical diaphragm;
   a first die, wherein the acousto-mechanical diaphragm is formed in the first die;
   a second die, wherein the distributed element filter is formed on a first side of the second die, and wherein the distributed element filter faces the electrically conductive element when the first die is attached to the second die;
   a cavity defined between the acousto-mechanical diaphragm and the distributed element filter when the first die is attached to the second die; and
   a ground plane formed on a second side of the second die opposite to the first side.

2. The pressure sensor of claim 1, wherein an amplitude of the electrical output signal from the pressure sensor changes from a nominal amplitude in response to the deflection of the acousto-mechanical diaphragm, at least one of a dynamic pressure or a static pressure is measured based on a change in the amplitude of the electrical output signal from the nominal amplitude, and wherein the electrical output signal is at the nominal amplitude when there is no deflection of the acousto-mechanical diaphragm.

3. The pressure sensor of claim 1, wherein the air gap is configured to capacitively couple the electrically conductive element to the distributed element filter, and wherein the distributed element filter has a nominal resonant frequency when there is no change to the air gap, and wherein a change in a capacitance between the electrically conductive element and the distributed element filter occurs in response to the deflection of the acousto-mechanical diaphragm and a resonant frequency of the of the distributed element filter changes from the nominal resonant frequency in response to the change in the capacitance.

4. The pressure sensor of claim 3, wherein an amplitude of the electrical output signal from the pressure sensor changes in response to a change in the resonant frequency of the distributed element filter caused by the change in pressure on the acousto-mechanical diaphragm, and wherein the amplitude of the electrical output signal is used to measure a dynamic pressure or a static pressure in response to the electrical input signal being received by the pressure sensor.

5. The pressure sensor of claim 1, wherein the input terminal is configured to electrically connect the pressure sensor to a signal generator to receive the electrical input signal, and the output terminal is configured to electrically connect the pressure sensor to a pressure measurement device configured to measure at least one of a dynamic pressure or a static pressure.

6. The pressure sensor of claim 1, wherein the distributed element filter comprises a plurality of electrically conductive components, each electrically conductive component comprising:
   a first elongated member;
   a second elongated member extending parallel to the first elongated member at a first preset spacing between the first elongated member and the second elongated member; and
   a base member connecting one end of the first elongated member to an adjacent end of the second elongated member, wherein the electrically conductive components are disposed parallel to one another and at a second preset spacing from one another with the base members being alternately placed on opposite sides of the distributed element filter.

7. The pressure sensor of claim 1, wherein the first die, the second die, the electrically conductive element and the distributed element filter each comprise a material to allow the pressure sensor to operate at a temperature at or above about 600 degrees centigrade.

8. The pressure sensor of claim 1, wherein the acousto-mechanical diaphragm comprises a predetermined thickness and a preset size when formed in the first die, and the first die comprises a material having a selected elastic modulus, and wherein an acoustic resonant frequency of the pressure sensor is determined based on at least one of the predetermined thickness of the acousto-mechanical diaphragm, the preset size of the acousto-mechanical diaphragm, or the selected elastic modulus of the material of the acousto-mechanical diaphragm.

9. The pressure sensor of claim 1, further comprising a vent channel between the cavity and an environment outside of the pressure sensor, wherein the vent channel provides a pressure equilibrium on each side of the acousto-mechanical diaphragm for selectively sensing or measuring dynamic pressure by the pressure sensor.

10. The pressure sensor of claim 9, wherein the air gap comprises a selected width and wherein an amount of the dynamic pressure is measured based on an amount of deflection of the acousto-mechanical diaphragm into the air gap caused by the change in pressure on the acousto-mechanical diaphragm.

11. The pressure sensor of claim 9, wherein the vent channel is closed or excluded from the pressure sensor to allow deflection of the acousto-mechanical diaphragm in response to static pressure.

12. The pressure sensor of claim 1, further comprising:
   an array of pressure sensors, each pressure sensor being configured to measure a different predetermined acoustic frequency band of acoustic pressure and each pressure sensor comprising:
      an acousto-mechanical diaphragm;
      an electrically conductive element formed on the acousto-mechanical diaphragm; and
      a distributed element filter spaced from the electrically conductive element by an air gap, wherein the acousto-mechanical diaphragm, the electrically conductive element and the distributed element filter are configured to measure a particular predetermined acoustic frequency band of acoustic pressure.

13. The pressure sensor of claim 12, wherein, for each pressure sensor, the electrically conductive element is capacitively coupled to the distributed element filter, and the acousto-mechanical diaphragm is configured to allow the air gap to change in response to the change in pressure on the acousto-mechanical diaphragm, a capacitance of the distributed element filter changes in response to the change in the air gap and a resonant frequency of the distributed element filter changes in response to the change in capacitance of the distributed element filter to measure the particular predetermined acoustic frequency band of acoustic pressure.

14. A system for measuring pressure, comprising:
   a signal generator;
   a pressure sensor configured to sense a change in pressure and to receive an electrical input signal from the signal generator, wherein the pressure sensor comprises:
      an acousto-mechanical diaphragm;
      an electrically conductive element formed on the acousto-mechanical diaphragm;
      a distributed element filter spaced from the electrically conductive element by an air gap, wherein the air gap changes in response to a deflection of the acousto-mechanical diaphragm caused by a change in pressure on the acousto-mechanical diaphragm, and an amplitude of an electrical output signal from the pressure sensor changes from a nominal amplitude in response to the deflection of the acousto-mechanical diaphragm;
   a pressure measurement device configured to measure at least one of a dynamic pressure or a static pressure based on a change in the amplitude of the electrical output signal from the pressure sensor;
   a first die, wherein the acousto-mechanical diaphragm is formed in the first die;
   a second die, wherein the distributed element filter is formed on a first side of the second die, and wherein the distributed element filter faces the electrically conductive element when the first die is attached to the second die;
   a cavity defined between the acousto-mechanical diaphragm and the distributed element filter when the first die is attached to the second die; and
   a ground plane formed on a second side of the second die opposite to the first side.

15. The system of claim 14, wherein the pressure measurement device comprises:
   a signal receiver to receive the electrical output signal from the pressure sensor;
   a signal processor configured to measure at least one of the dynamic pressure or the static pressure based on the electrical output signal from the pressure sensor; and
   a device to record and/or present a measured dynamic pressure or a measured static pressure.

16. The system of claim 14, further comprising a vent channel between the cavity and an environment outside of the pressure sensor, wherein the vent channel provides a pressure equilibrium on each side of the acousto-mechanical diaphragm for selectively sensing or measuring dynamic pressure by the pressure sensor.

17. The system of claim 16, wherein the vent channel is closed or excluded from the pressure sensor to allow deflection of the acousto-mechanical diaphragm in response to static pressure.

18. A method of making a pressure sensor, comprising:
forming an acousto-mechanical diaphragm;
forming an electrically conductive element on the acousto-mechanical diaphragm; and
forming a distributed element filter;
spacing the distributed element filter from the electrically conductive element by an air gap, wherein the air gap changes in response to a deflection of the acousto-mechanical diaphragm caused by a change in pressure on the acousto-mechanical diaphragm;
forming a cavity in a first die to define the acousto-mechanical diaphragm;
forming a first layer of electrically conductive material within the cavity on the acousto-mechanical diaphragm to define the electrically conductive element on the acousto-mechanical diaphragm;
forming a second layer of electrically conductive material on a first side of a second die to define the distributed element filter, wherein the distributed element filter faces the electrically conductive element when the first die is attached to the second die;
forming a third layer of electrically conductive material on a second side of the second die opposite to the first side to define a ground plane; and
attaching the first die to the second die, wherein the cavity is defined between the acousto-mechanical diaphragm and the distributed element filter when the first die is attached to the second die.

19. The method of claim 18, further comprising forming a vent channel in the first die between the cavity and an environment outside of the pressure sensor when the first die is attached to the second die, wherein the vent channel provides a pressure equilibrium on each side of the acousto-mechanical diaphragm for selectively sensing or measuring a dynamic pressure by the pressure sensor.

20. The method of claim 18, further comprising:
forming an array of pressure sensors, each pressure sensor being configured to measure a different predetermined acoustic frequency band of acoustic pressure, wherein forming each pressure sensor comprises:
forming an acousto-mechanical diaphragm;
forming an electrically conductive element formed on the acousto-mechanical diaphragm; and
forming a distributed element filter spaced from the electrically conductive element by an air gap, wherein the acousto-mechanical diaphragm, the electrically conductive element and the distributed element filter are configured to measure a particular predetermined acoustic frequency band of acoustic pressure.

* * * * *